United States Patent [19]

Ito et al.

[11] Patent Number: 4,901,831

[45] Date of Patent: Feb. 20, 1990

[54] CLUTCH

[75] Inventors: Kenichiro Ito, Shizuoka; Hiromi Nojiri; Kenro Adachi, both of Iwata, all of Japan

[73] Assignee: NTN Toyo Bearing Co., Ltd., Osaka, Japan

[21] Appl. No.: 254,749

[22] Filed: Oct. 7, 1988

[30] Foreign Application Priority Data

Oct. 9, 1987 [JP] Japan .................. 62-255212
Jan. 22, 1988 [JP] Japan .................. 63-13421
Mar. 7, 1988 [JP] Japan .................. 63-53307
May 27, 1988 [JP] Japan .................. 63-130770

[51] Int. Cl.4 .................. F16D 15/00; F16D 43/20
[52] U.S. Cl. .................. 192/38; 74/625; 180/79.1; 192/41 A; 192/45; 192/54
[58] Field of Search .................. 192/38, 45, 45.1, 54, 192/41 A; 188/134; 74/661, 625; 60/711, 718; 180/79.1

[56] References Cited

U.S. PATENT DOCUMENTS

Re. 25,594 6/1964 Lund .................. 188/134 X
3,243,023 3/1966 Boyden .................. 192/8 R
3,640,092 2/1972 Neal et al. .................. 188/134 X
3,893,534 7/1975 Steinmann .................. 180/79.1

Primary Examiner—Rodney H. Bonck
Attorney, Agent, or Firm—Armstrong, Nikaido Marmelstein, Kubovcik & Murray

[57] ABSTRACT

A clutch having an outer member, an inner member mounted in the outer member, a cage interposed between the outer and inner members and cam elements movably mounted in pockets formed in the cage. Torque-setting elastic members are provided between the cage and one of the inner and outer members so that while the torque on the elastic member is smaller than a preset value, they will rotate in unison with some clearance left therebetween in the direction of rotation. When the torque on the elastic member gets larger than the preset value, the elastic member deforms to allow the cage to turn relative to the member engaged therewith. Now, the cam elements are pushed by the cage into engagement with both cam surfaces formed on the inner periphery of the outer member and the outer periphery of the inner member, thus brining the two members into engagement.

1 Claim, 9 Drawing Sheets

CLUTCH

The present invention relates to a clutch suitable for use with e.g. an electric power steering assembly.

Figure 31:
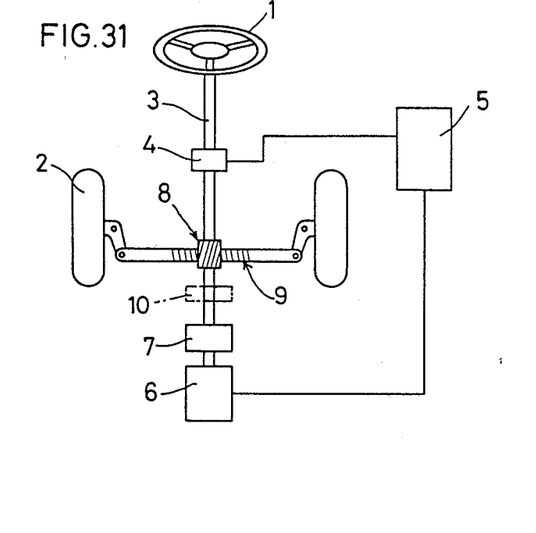
FIG. 31 is a schematic view showing a prior art electric power steering assembly.

A typical prior art electric power steering assembly is shown in FIG. 31. With this type of assembly, a torque sensor 4 is provided which serves to actuate a motor 6 through a control unit 5 upon detection of a torque of a steering shaft 3 generated owing to the resistance of vehicle wheels 2 when a steering wheel 1 is turned in one direction. The motor 6 has its drive shaft coupled to a pinion 8 of the steering shaft 3 through a reduction unit 7. The pinion 8 meshes with a rack 9 connected to the vehicle wheels 2. With this arrangement, since the driving power of the motor 6 is transmitted to the wheels, they can be controlled with a very small manual steering force.

But, this type of electric power steering assembly has one drawback that if the driving system including the control unit 5, the motor 6 and the reduction unit 7 should get out of order, the force required to turn the steering wheel 1 will grow too large to steer the vehicle wheels 2. This is because the reduction unit 7 and the motor 6 are still coupled to the steering shaft 3.

As one solution to this problem, it is known to provide a clutch 10 between the reduction unit 7 and the pinion 8. But if an electromagnetic clutch is used, it is necessary to use a rather large-sized one to obtain a required torque. If a claw clutch is used, a rather large force is required to set the clutch in an engaging position and to disengage it under loaded conditions.

An object of the present invention is to provide a clutch which obviates the abovesaid shortcomings.

In accordance with the present invention, there is provided a clutch comprising: an outer member formed on its inner periphery with a first cam surface; an inner member coaxially mounted in the outer member and formed on its outer periphery with a second cam surface; a cage interposed between the outer member and the inner member and thus between the first cam surface and the second cam surface and formed with a plurality of pockets; means for providing a clearance in the direction of rotation between the cage and with one of the outer member and the inner member, a torque-setting elastic member mounted between the cage and one of the outer member and the inner member to hold the means providing the clearance in a neutral position with the clearance left therebetween so as to be deformed until the clearance disappears when it is subjected to a torque larger than a predetermined torque; cam members mounted in the respective pockets formed in the cage and adapted to come into engagement with the first and second cam surfaces when the cage is turned with respect to the one of the two members by a predetermined angle; and elastic means for biasing the cam members in the circumferential direction of the cage.

Since the clutch according to be present invention has a relatively small number of parts, that is, the outer member, the inner member, the cage and the rolling elements, it is not only assembled readily but also compact in size.

Other features and objects of the present invention will become apparent from the following description taken with reference to the accompanying drawings, in which.

Throughout the specification, like parts are designated by the same or like reference numbers.

[FIRST EMBODIMENT]

Figures 1, 2:
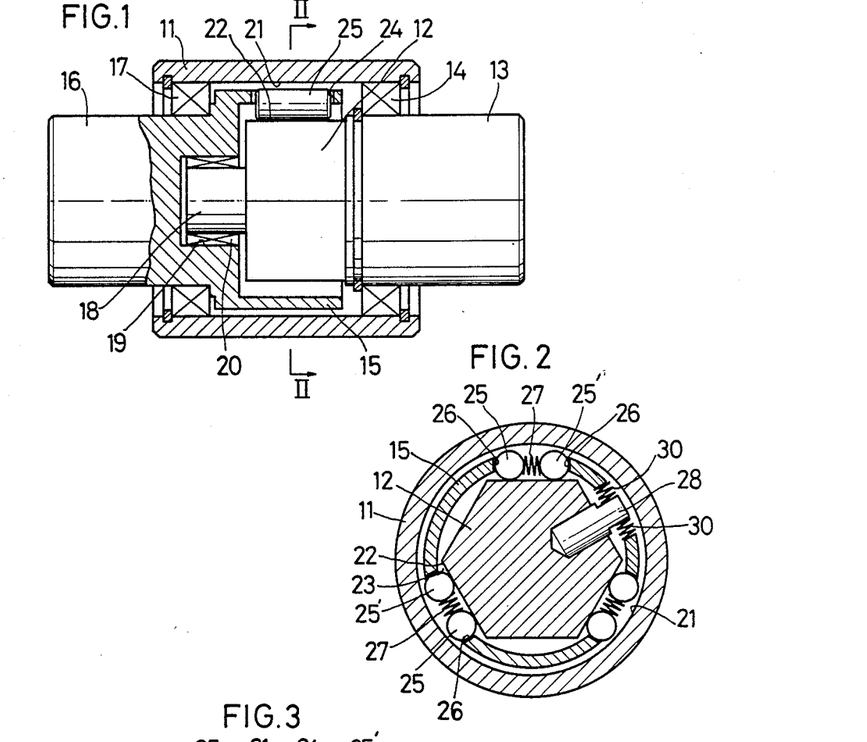
FIG. 1 is a vertical sectional view of the first embodiment of the clutch according to the present invention.
FIG. 2 is a sectional view taken along line II—II of FIG. 1.

FIGS. 1 and 2 show the first embodiment of the clutch according to the present invention which comprises an outer member 11, an inner member 12 mounted in the outer member and provided at its one end with a shaft 13 rotatably supported in the outer member 11 through a bearing 14, and a cylindrical cage 15 interposed between the outer member 11 and the inner member 12. The cage 15 is provided at one end thereof with a shaft 16 rotatably supported in the outer member 11 through a bearing 17.

The inner member 12 is further provided at its other end opposed to the closed end of the cage 15 with a small-diameter shaft 18 which is received in a recess 19 formed in the closed end of the cage 15. The shaft 18 is rotatably supported in the cage 15 through a bearing 20.

The outer member 11 has its inner periphery 21 cylindrically shaped, whereas the inner member 12 has its outer periphery shaped into a polygonal shape having cam surfaces 22. A plurality of wedge-like spaces 23 are defined between the cam surfaces 22 and the cylindrical surface 21, each space having such a shape that its width will decrease toward its opposed ends.

The cage 15 is formed with pockets 24 at positions corresponding to the wedge-like spaces 23. A pair of rolling elements 25 and 25' are received in each pocket 24. Between each pair of rolling elements 25 and 25', a spring 27 is mounted to bias them away from each other to press them against a pair of walls 26 at both sides of each wedge-like surface 23.

Figure 3:
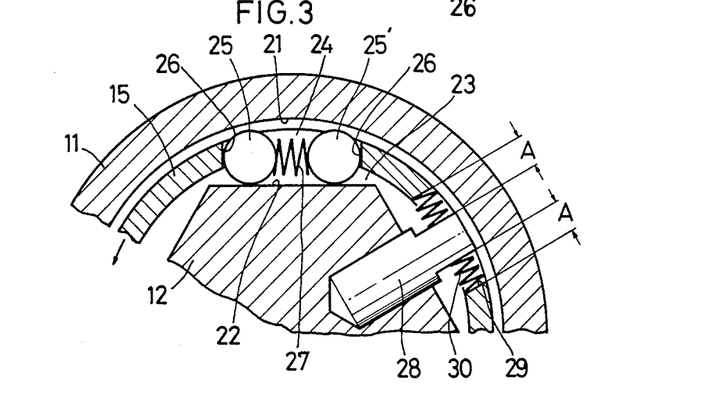
FIG. 3 is an enlarged sectional view of the same.

The cage 15 is adapted to engage the inner member 12 through a pin 28. As shown in FIG. 3, the pin 28 has its one end fixedly embedded in the outer periphery of the inner member 12 with the other end extending through a hole 29 formed in the cage 15. The hole 29 is elongated in the circumferential direction of the cage 15 so as to form a clearance A which extends in the direction of rotation of the clutch between the wall of the hole 29 and the pin 28. To hold the pin 28 in the central position of the hole 29, torque-setting elastic members 30 are mounted in the hole 29 at both sides of the pin 28. While the pin 28 is held in the center of the hole 29, the rolling elements 25 and 25' are kept out of engagement with any of the narrow areas of the wedge-like spaces 23.

When a torque larger than a preset value acts on the input shaft 16, one of the elastic members 30 is adapted to be compressed until the clearance A in the direction of rotation at one side of the pin 28 disappears to engage the cage 15 and the inner member 12 with each other through the pin 28.

Figure 5:
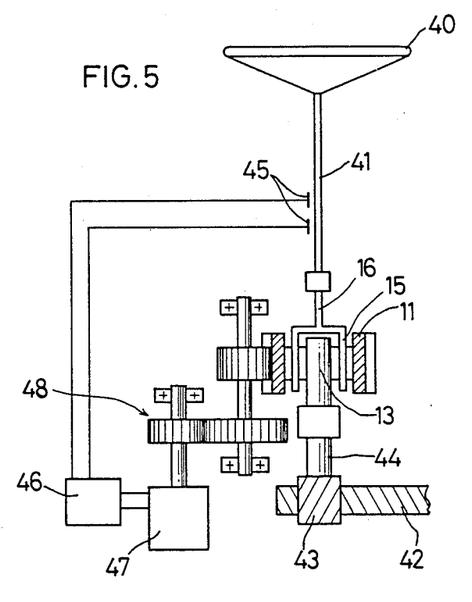
FIG. 5 is a schematic view showing how the clutch according to the present invention is mounted in an electric power steering assembly.

When applying the clutch in the first embodiment to an electric power steering assembly shown in FIG. 5, the input shaft 16 is coupled to a steering shaft 41 having a steering wheel 40, and the output shaft 13 is coupled to a shaft 44 of a pinion 43 in meshing engagement with a rack 42. A sensor 45 for detecting a torque of the steering shaft 41 is provided to control a motor 47 through a control unit 46. The rotation of the motor 47 is transmitted to the outer member 11 through a torque transmitter 48 in a gear transmission. The outer member 11 has to be provided with a torque transmission member such as a gear adapted to be brought into engagement with the torque transmitter 48.

In this state, even when the steering wheel 40 is turned in such a direction as to rotate the cage 15 to the lefthand side of FIG. 3, the cage 15 will not be rotated so conspicuously with respect to the inner member 12 if the steering force is smaller than the preset torque determined by the bias of the elastic members 30. Thus, the rolling elements 25 and 25' are kept out of the narrow areas of the wedge-like spaces 23, leaving the clutch disengaged.

Thus, while the steering force is small, no power transmission from the outer member 11 to the inner member 12 takes place. This means that the vehicle is steered only with the manual steering force.

Figure 4:
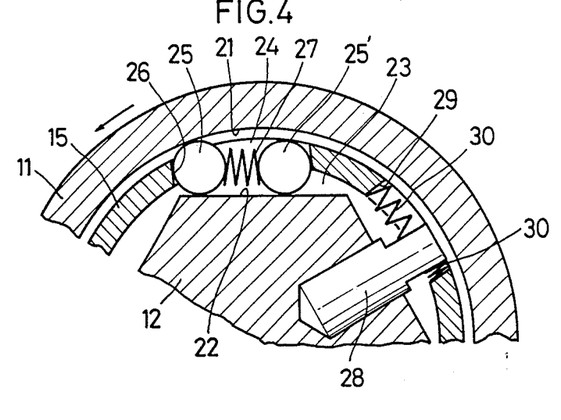
FIG. 4 is a sectional view of the same in a working condition.

If the manual steering force surpasses the preset torque determined by the bias of the elastic members 30, the cage 15 will compress one of the elastic members 3 until the clearance A at one side disappears as shown in FIG. 4. In this state, the steering force is transmitted to the vehicle wheels through the cage 15, the pin 28, the inner ring 12, the pinion shaft 44, the pinion 43 and the rack 42.

When the cage 15 is turned to the lefthand side with respect to the inner member 12, one of the rolling elements 25 and 25', that is the left one 25, is biassed by the spring 27 to be engaged in the narrow area at one side of the wedge-like space 23.

The vehicle wheels will offer resistance when they are controlled with the steering force, thus subjecting the steering shaft 41 to a torque. The torque sensor 45 will pick up the torque of the steering shaft 41 to start the motor 47 through the control unit 46. The driving power of the motor 47 is transmitted to the outer member 11, then to the inner member 12, which is now in engagement with the outer member 11 through the rolling elements 25, and to the vehicle wheels through the shaft 13 of the inner member 12, the pinion shaft 44, the pinion 43 and the rack 42.

As described above, the power steering mode is put into action when the manual steering force surpasses the preset torque, making it possible to control the vehicle wheels with a minimum steering force.

If the driving system including the control unit 46 and the motor 47 should break down, the cage 15 can be turned e.g. to the lefthand side with respect to the inner member 12 by turning the steering wheel 40 so as to press the rolling elements 25 into the narrow area at one side of the wedge-like spaces (FIG. 4). But only the torque of the cage 5 is not enough to press the rolling elements 25 into the narrow areas of the wedge-like spaces to engage the outer member and the inner member together. Thus, the rolling elements will freely slide along the cylindrical surface 21 of the outer member 11.

The steering force is now transmitted to the vehicle wheels through the cage 15, pin 28, inner member 12, pinion shaft 44, pinion 43 and rack 42 with the driving system disengaged from the steering system. Thus a manual steering force necessary to control the vehicle wheels is kept within a low level.

Next, it will be described how the clutch will operate when the steering wheel is receiving a counterforce from the vehicle wheels with the driving system disabled. When the vehicle is getting clear of a curve in the road, a force which counteracts the steering force is conveyed from the vehicle wheels to the steering wheel through the rack 42, pinion 43, pinion shaft 44 and inner member 12. To let the steering wheel slowly turn back into its original position with the counterforce from the vehicle wheels, the driver slackens the steering force until it gets smaller than the preset torque. In this state, since the cage 15 can scarcely turn against the inner member 12, the rolling elements 25 are kept from being pressed into the narrow areas at one side of the wedge-like spaces 23, keeping the outer member 11 out of engagement with the inner member 12. Thus, when the vehicle is clearing a curve, the cage 15 as well as the steering wheel coupled thereto can be smoothly turned back into their original position without giving the driver any bad steering feeling.

Figure 10:
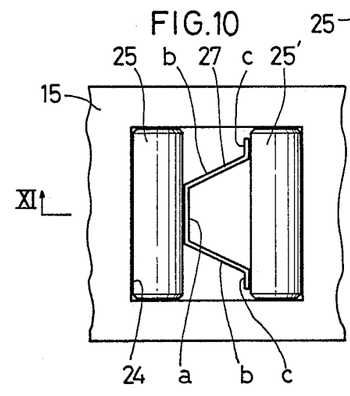
FIG. 10 is a plan view of another example of the springs mounted in the pockets.
Figure 11:
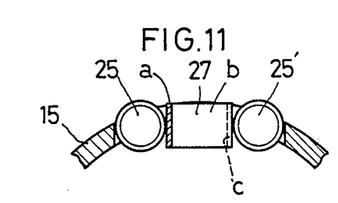
FIG. 11 is a sectional view taken along line XI—XI of FIG. 10.

In the first embodiment, the spring 27 mounted in each pocket 24 may be a coil spring or may be a leaf spring as shown in FIGS. 10 and 11. In the latter case, the leaf spring 27 should comprise a portion a adapted to be brought into contact with the rolling element 25 and rearwardly tapered wing portions b provided at both sides of the portion a and flanged portions c provided at rear of the portions b and adapted to be brought into contact with the other rolling element 25'.

Figure 12:
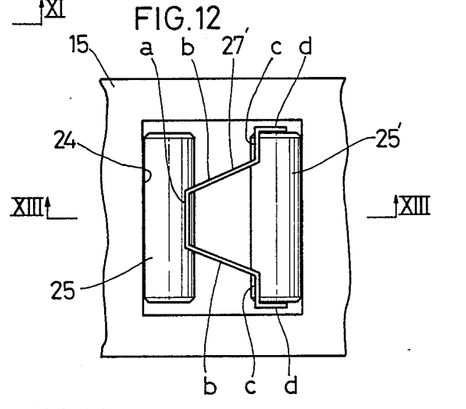
FIG. 12 is a plan view of still another example of the springs.
Figure 13:
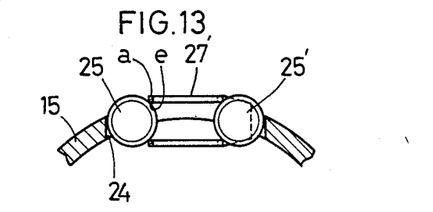
FIG. 13 is a sectional view taken along line XIII—XIII of FIG. 12.

A leaf spring 27' shown in FIG. 12 and 13 may be interposed between each pair of rolling elements 25 and 25' instead of the leaf spring 27. It is provided at the outer end of the flanged portions c with legs d adapted to engage the end faces of the rolling element 25 and is formed with a slit e extending longitudinally across the portion a, the wing portions b and the flanged portions c. The rolling elements 25 and 25' are adapted to partially engage in the slits e. With this arrangement, the cage 15 can be turned with respect to the inner member 12 until each pair of rolling elements 25 and 25' get into abutment with each other. This means that the clutch with the leaf springs 27' can form a larger working angle than the clutch with the leaf springs 27. If the maximum working angle of both clutches are equal, the clutch with the leaf springs 27' can use rolling elements having a larger diameter than the rolling elements of the clutch with the leaf springs 27. The larger the diameter of the rolling elements, the larger the capacity of the clutch will be.

[SECOND EMBODIMENT]

Figure 6:
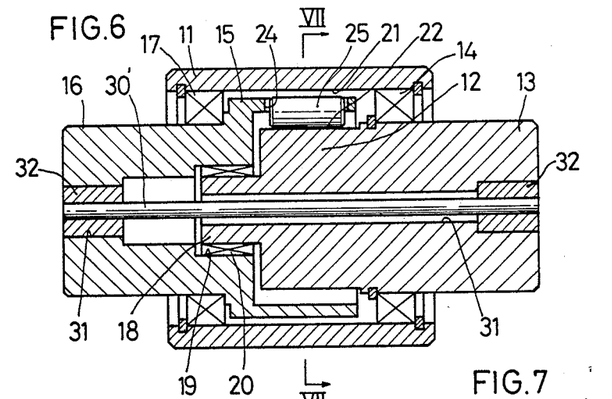
FIG. 6 is a vertical sectional view of the second embodiment.
Figure 7:
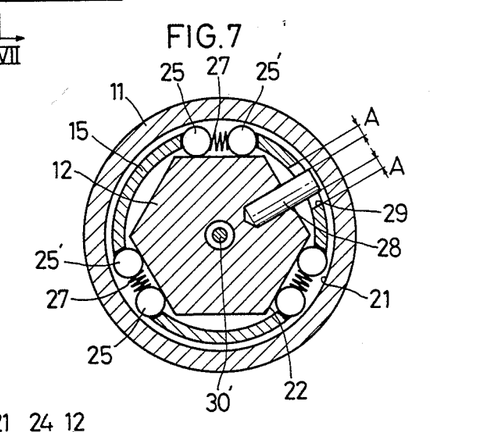
FIG. 7 is a sectional view taken along line VII—VII of FIG. 6.

FIGS. 6 and 7 show the second embodiment of the clutch according to the present invention in which an axial center bore 31 is formed through the inner member 12, its shaft 13 and the shaft 16 of the cage 15. A torsion bar as a torque-setting elastic member 30 extends through the bore 31 and has its both ends fixedly supported on the inner wall of the shafts 13 and 16 through holders 32.

A clearance A is formed between the pin 28 and the hole 29 in the inner member 12. This embodiment is otherwise the same in structure and function as in the first embodiment.

[THIRD EMBODIMENT]

Figure 8:
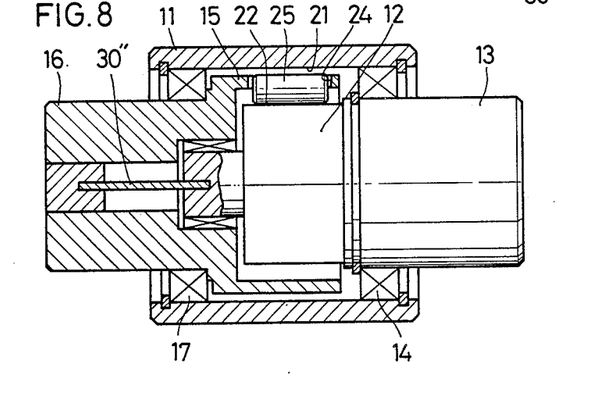
FIG. 8 is a vertical sectional view of the third embodiment.

FIG. 8 shows the third embodiment of the clutch according to the present invention in which the torsion bar as the torque-setting member 30' in the second embodiment is replaced with a torque-setting member 30" in the form of a leaf spring.

[FOURTH EMBODIMENT]

Figure 9:
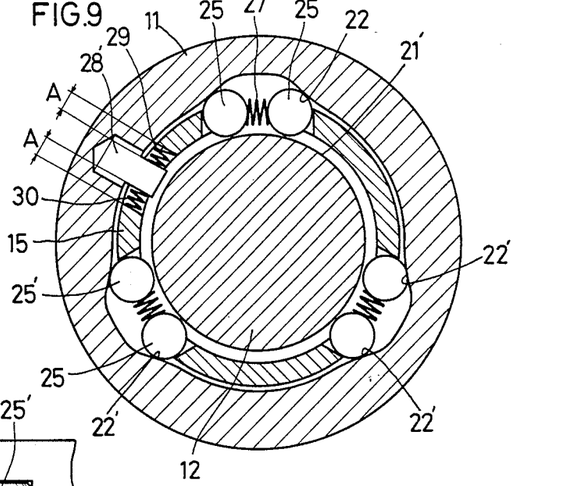
FIG. 9 is a cross-sectional view of the fourth embodiment.

FIG. 9 shows the fourth embodiment in which the outer member 11 is formed on its inner periphery with recessed cam surfaces 22', whereas the inner member 12 has its outer periphery 21' cylindrically shaped. In other words, the cam surfaces and the cylindrical surfaces are arranged oppositely to those in the first embodiment.

A pin 28' has its one end fixedly mounted in the inner periphery of the outer member 11 and the other end passed loosely through a hole 29 formed in the cage 15 so as to leave clearances A in the direction of rotation.

A torque-setting elastic members 30 in the form of a spring are interposed between the pin 28' and the wall of the hole 29 to hold the pin 28' in the center of the hole 29.

When applying the clutch in the fourth embodiment to the electric steering assembly shown in FIG. 5, the outer member 11 is coupled to the pinion shaft 44 so that the driving force of the motor 27 will be transmitted to the inner member 12.

[FIFTH EMBODIMENT]

Figures 14, 15, 16:
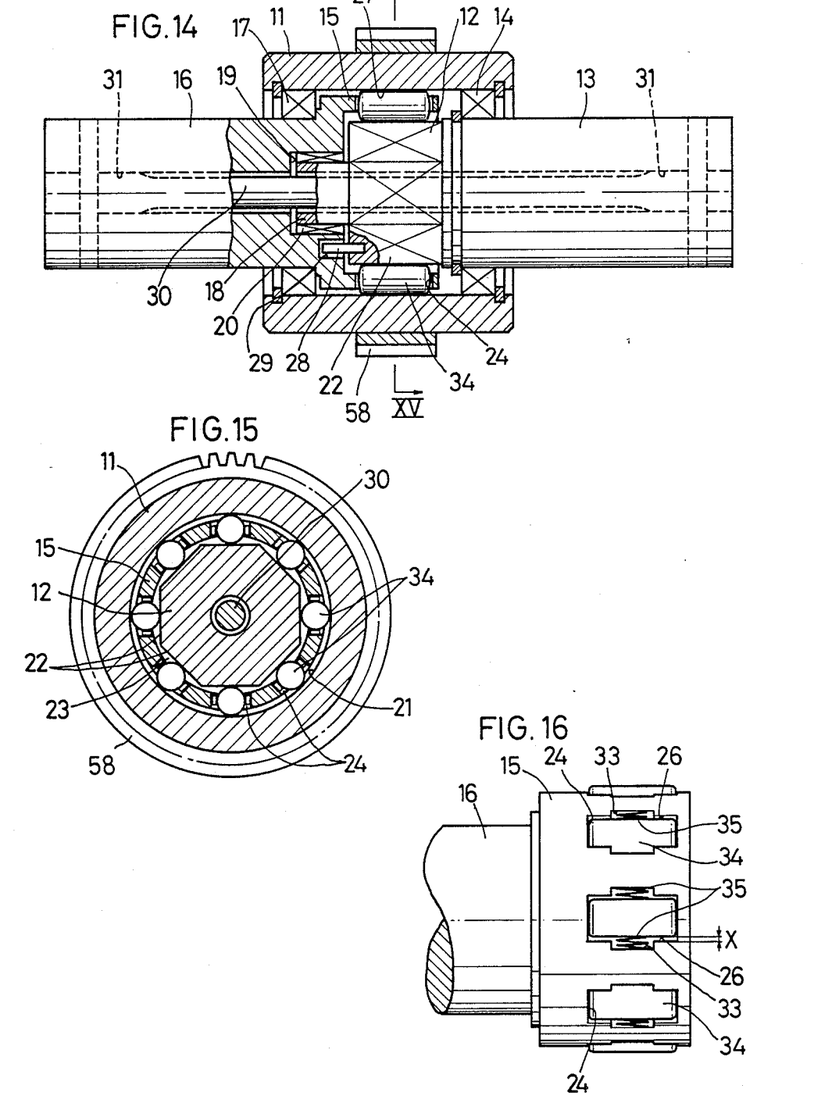
FIG. 14 is a vertical sectional view of the fifth embodiment.
FIG. 15 is a sectional view taken along line XV—XV of FIG. 14.
FIG. 16 is a front view of the cage of the same.

FIGS. 14 to 20 show the fifth embodiment of the clutch according to the present invention in which one rolling element 34 is received in each pocket 24 formed in the cage 15. Each pocket 24 is formed in its circumferentially opposed side walls 26 at their central portion with cutouts 33 as shown in FIG. 16.

Figure 17:
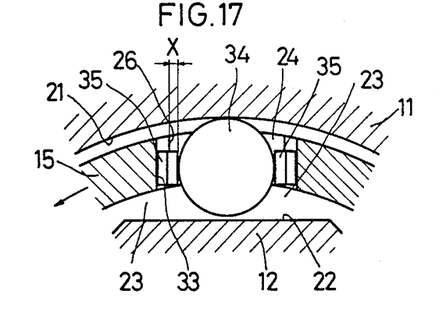
FIG. 17 is an enlarged sectional view of a portion of the same.

A spring 35 is mounted in each cutout 33 to bias the rolling element 34 in each pocket 24 from both sides and hold it in the circumferential center thereof. Between the rolling element 34 and the guide surfaces 26 of each pocket 24, clearances X in the direction of rotation are formed as shown in FIG. 17.

The rolling element 34 in each pocket 24 is adapted to be urged by one of the springs 35 to bite into the narrow area at one side of the wedge-like space 23 when the cage 15 is rotated in one direction. By rotating the cage 15 in the reverse direction, one of the side walls 25 will abut the rolling element 34 to push it out of the narrow area.

Figures 19, 20, 21, 22, 23:
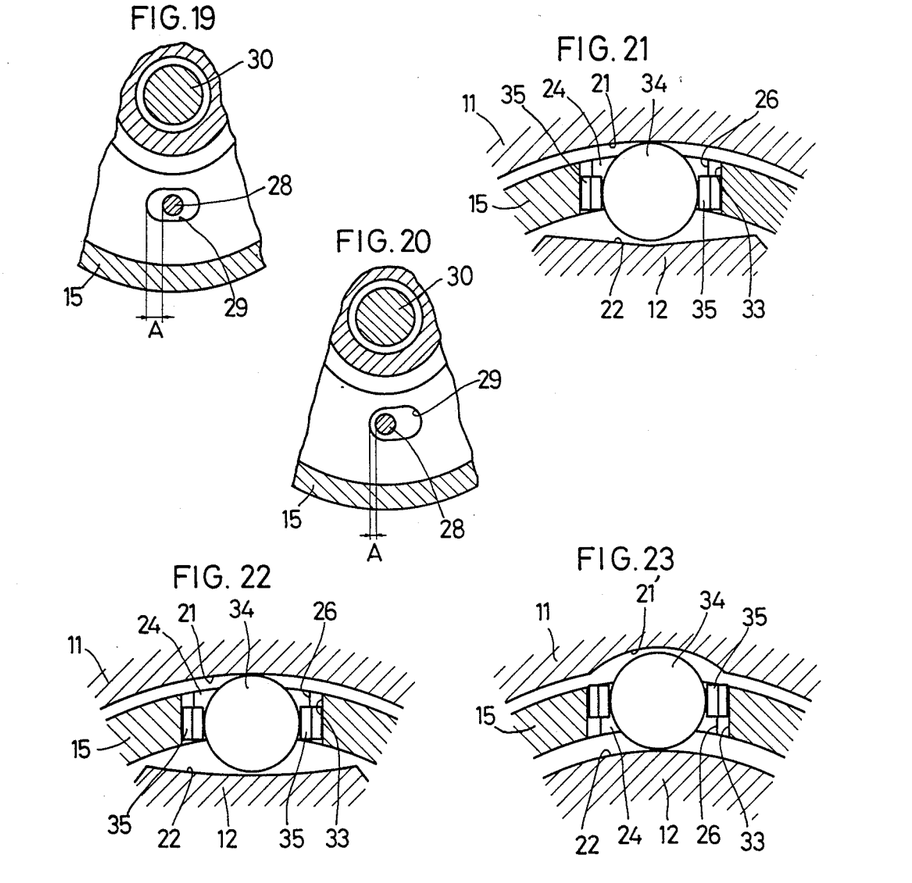
FIG. 19 is a vertical sectional side view of a portion of the cage and the inner member showing how they are in engagement with each other.
FIG. 20 is a similar view of the same in a working condition.
FIGS. 21 to 23 are enlarged sectional views of the sixth to eighth embodiments.

As shown in FIG. 14, the cage 15 and the inner member 12 are adapted to be put into engagement with each other by means of a pin 28 fixedly mounted in the end face of the inner member 12 at its peripheral portion and having its protruding end inserted in a hole 29 formed in the closed end of the cage 15. As shown in FIG. 19, clearances A in the direction of rotation are formed between the pin 28 and the wall of the hole 29. The clearances A are larger than the clearances X formed between the guide surfaces 26 and the rolling elements 34.

In this embodiment, a torsion bar as used in the second embodiment is used as the torque-setting member 30 which is passed through the axial bore 31 formed through the input shaft 16 and the output shaft 13 and has its both ends fixed to the shafts 16 and 13. The torsion bar 30 serves to bias and hold the pin 28 in the center of the hole 29. In this state, the rolling elements 34 are not trapped in any of the narrow areas at both sides of the wedge-like spaces 23.

The torsion bar 30 is adapted to be distorted when a torque larger than a predetermined value acts thereon until one of the clearances A disappears to bring the cage 15 into engagement with the inner member 12 through the pin 28.

The clutch in this embodiment can be applied to the electric power steering assembly shown in FIG. 5 in the same manner as in the previous embodiments.

Even when the steering wheel 40 is turned in such a direction as to rotate the cage 15 to the lefthand side of FIG. 17, the cage 15 will not be rotated so conspicuously with respect to the inner member 12 if the steering force is smaller than the preset torque determined by the rigidity of the torsion bar 30. Thus, the rolling elements 34 are kept out of the narrow areas of the wedge-like spaces 23, leaving the clutch disengaged.

Thus, while the steering force is small, no power transmission from the outer member 11 to the inner member 12 takes place. This means that the vehicle is steered only with the manual steering force.

Figure 18:
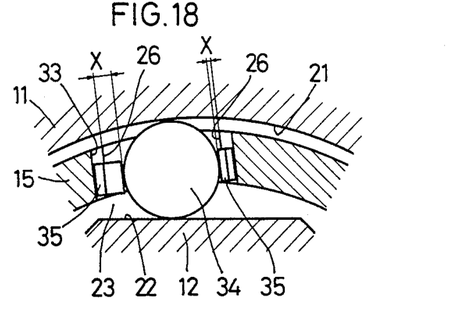
FIG. 18 is a sectional view of the same in a working condition.

If the manual steering force surpasses the preset torque determined by the rigidity of the torsion bar 30, it will be distorted to turn the cage 15 to the lefthand side with respect to the inner member 12 and thus to cause the rolling elements 34 to be engaged in the narrow areas at one side of the wedge-like spaces 23 (FIG. 18). In this state, as shown in FIG. 20, a narrow clearance A is formed in the direction of rotation at one side of the pin 23. The clearance A is narrower than a clearance X' shown in FIG. 18 and formed in the direction of rotation between the rolling element 34 and the guide surface 26 at the righthand side of each pocket.

The vehicle wheels will offer resistance when they are controlled with the steering force, thus subjecting the steering shaft 41 to a torque. The torque sensor 45 will pick up the torque of the steering shaft 41 to start the motor 47 through the control unit 46. The driving power of the motor 47 is transmitted to the outer member 11, then to the inner member 12, which is now in engagement with the outer member 11 through the rolling elements 25, and to the vehicle wheels through the shaft 13 of the inner member 12, the pinion shaft 44, the pinion 43 and the rack 42.

As described above, the power steering mode is put into action when the manual steering force surpasses the preset torque, making it possible to control the vehicle wheels with a minimum steering force.

If the driving system including the control unit 46 and the motor 47 should break down, the cage 15 can be turned e.g. to the lefthand side with respect to the inner member 12 by turning the steering wheel 40 so as to press the rolling elements 27 into the narrow area at one side of the wedge-like spaces (FIG. 18).

But, when the cage is further turned to the left from this state, the clearance A will disappear, causing the inner member 12 to move with the cage and thus allowing the rolling elements 34 to freely roll on the cylindrical surface 21 of the outer member 11.

The steering force is now transmitted to the vehicle wheels through the cage 15, pin 28, inner member 12, pinion shaft 44, pinion 43 and rack 42 with the driving system disengaged from the steering system. Thus a manual steering force necessary to control the vehicle wheels is kept within a low level.

Otherwise, the operation of the clutch of this embodiment is substantially the same as those in the previous embodiments.

[SIXTH EMBODIMENT]

FIG. 21 shows the sixth embodiment of the present invention in which the inner member 12 is formed on its outer periphery with cam surfaces 22 having each side thereof recessed in a V-shape.

[SEVENTH EMBODIMENT]

FIG. 22 shows the seventh embodiment of the present invention in which the inner member 12 is formed with cam surfaces 22 having each side recessed arcuately.

The cam surfaces 22 recessed arcuately or in a V-shape will serve to reduce the angle of rotation of the cage 15 required to push and engage the rolling elements into the narrow areas at one side of the wedge-like spaces 23.

[EIGHTH EMBODIMENT]

FIG. 23 shows the eighth embodiment of the present invention in which the outer member 11 is formed on its inner periphery with recessed cam surfaces 21', while the inner member 12 has its outer periphery 22 cylindrically shaped. The pin 28 is fixedly mounted in one of the outer member 11 and the cage 15 while its protruding end is loosely inserted in a hole formed in the other.

When the clutch of this embodiment is applied to the power steering assembly shown in FIG. 5, the outer member 11 is coupled to the pinion shaft 44 so that the driving force of the motor will be transmitted to the inner member 12.

In this embodiment, a pair of springs may be interposed at both sides of the pin 28 shown in FIG. 19 instead of providing the torsion bar 30 as in the fifth embodiment, to hold the pin 28 in the neutral position in the hole.

[NINTH EMBODIMENT]

Figure 24:
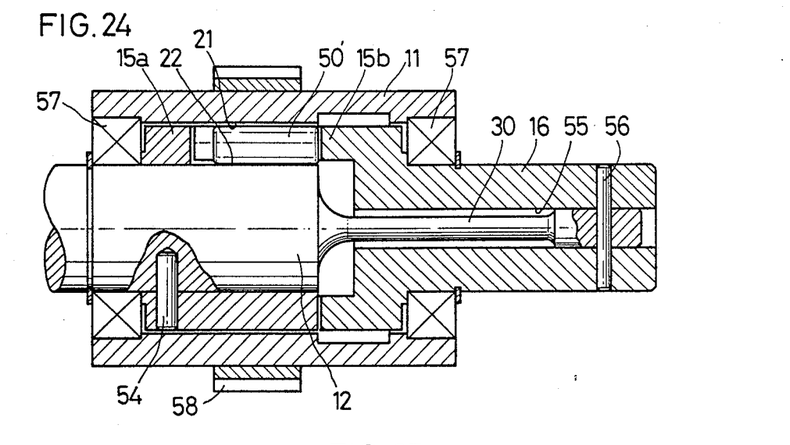
FIG. 24 is a vertical sectional view of the ninth embodiment taken along line XXIV—XXIV of FIG. 25.
Figure 25:
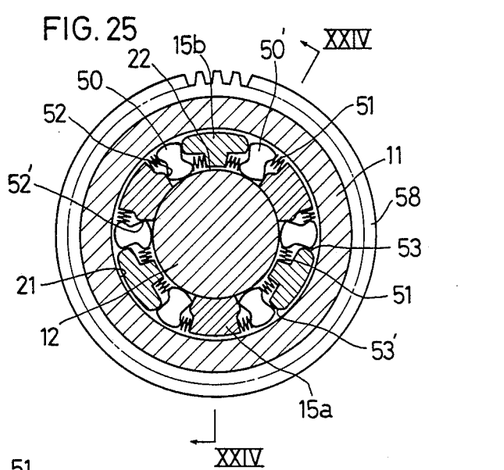
FIG. 25 is a cross-sectional view of the same.

FIGS. 24 and 25 show the ninth embodiment of the clutch according to the present invention which comprises an outer member 11, an inner member 12, cages 15a and 15b, pairs of sprags 50 and 50', input shaft 16, springs 51 and a torsion bar 30 as a torque-setting elastic member.

The outer member 11 has its inner periphery 64 cylindrically shaped in which is mounted the inner member 12 having its outer periphery 65 cylindrically shaped so as to oppose to the inner cylindrical surface 64 of the outer member 11. Pairs of sprags 50 and 50' are arranged between the inner periphery 64 and the outer periphery 65 in opposite ways to each other so that one of them will engage both the inner and outer peripheries 64 and 65 whenever they are rotated in either direction. A spring 51 is interposed between each of the sprags 50 and 50' and the cages 15a, 15b, biasing the sprags into engagement with the peripheries 64 and 65.

The cage 15a is formed with guide surfaces 52 and 52' for the sprags 50 and 50'. The cage 15b is formed with guide surfaces 53 and 53' and is integrally formed with the input shaft 16 adapted to be coupled to the steering shaft 41 shown in FIG. 5. The cage 15a is unrotatably fixed to the inner member 12 by means of a pin 54.

Figure 26:
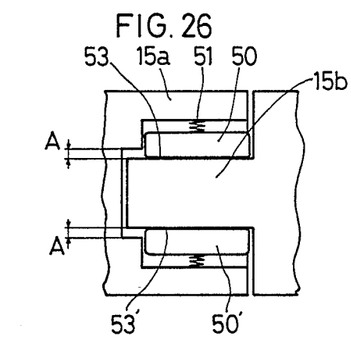
FIG. 26 is a partial plan view of the same showing the clearances A formed in the direction of rotation.

The inner member 12 is adapted to be coupled to the pinion shaft 44 shown in FIG. 5 at its one end and is integrally provided at the other end with a torsion bar 30 having its leading end fixed to the wall of a bore 55 formed in the input shaft 16 by means of a pin 56. Thus, the inner member 12 and the input shaft 16 are coupled together. The cages 15a and 15b are coupled together as shown in FIG. 26. The torsion bar 30 serves to hold the cages 15a and 15b in a neutral position with clearances A left therebetween in the direction of rotation. The bias of the torsion bar 30 represents the value of a preset torque.

While the cages 15a and 15b are in their neutral position, the sprags 50 and 50' are kept out of engagement with the cylindrical surfaces 64 and 65.

If the torque on the steering shaft 41 gets larger than the abovesaid preset toque, the torsion bar 30 will yield so that one of the clearances A will disappear to allow the cages 15a and 15b to get into engagement with each other. The inner member 12 and the input shaft 16 are thus brought into engagement with each other through the cages 15a and 15b.

The inner member 12 and the input shaft 16 are rotatably supported in the outer member 11 through bearings 57. The outer member 11 is provided on its outer periphery with a gear 58 adapted to mesh with the output gear in the torque transmitter 48 shown in FIG. 5.

The clutch in this embodiment can be applied to the electric power steering assembly shown in FIG. 5 in the same manner as in the previous embodiments.

Even when the steering wheel 40 is turned in such a direction as to rotate the cage 15 to the lefthand side of FIG. 25, the cage 15 will not be rotated so conspicuously with respect to the inner member 12 if the steering force is smaller than the preset torque determined by the rigidity of the torsion bar 30. Thus, the sprags 50, 50' are kept out of the engagement with the cylindrical surfaces 64, 65, leaving the clutch disengaged.

Thus, while the steering force is small, no power transmission from the outer member 11 to the inner member 12 takes place. This means that the vehicle is steered only with the manual steering force.

In this state, the steering force is transmitted to the vehicle wheels through the cages 15a, 15b, the pin 54, the inner member 12, the pinion shaft 44, the pinion 43 and the rack 42.

At the same time, the cage 15b will be turned to the lefthand side with respect to the inner member 12 so that their guide surfaces 53' will get out of contact with the sprags 50' located at the righthand side thereof. The sprags 50' are thus biased by their respective springs 51 into engagement with the cylindrical surfaces 64 and 65.

The vehicle wheels will offer resistance when they are controlled with the steering force, thus subjecting the steering shaft 41 to a torque. The torque sensor 45 will pick up the torque of the steering shaft 41 to start the motor 47 through the control unit 46. The driving power of the motor 47 is transmitted to the outer member 11 to rotate it in the direction of arrow B of FIG. 27. The rotation of the outer member is transmitted to the inner member 12, which is now in engagement with the outer member 11 through the sprags 50' and to the vehicle wheels through the shaft 13 of the inner member 12, the pinion shaft 44, the pinion 43 and the rack 42.

As described above, the power steering mode is put into action when the manual steering force surpasses the preset torque, making it possible to control the vehicle wheels with a minimum steering force.

Figure 27:
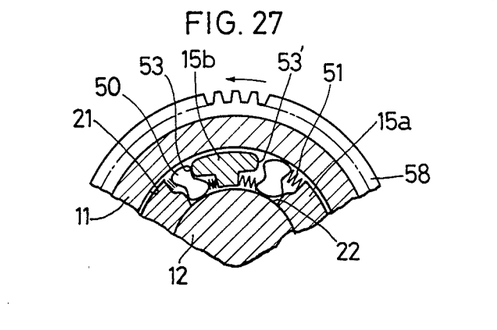
FIG. 27 is a partial cross-sectional view of the same in working condition.

If the driving system including the control unit 46 and the motor 47 should break down, the cage 15 can be turned e.g. to the lefthand side with respect to the inner member 12 by turning the steering wheel 40 so as to press the sprags 24' against the cylindrical surfaces 64 and 65 (FIG. 27).

But only the torque applied through the input shaft 16 and the cages 15b is not enough to bring the sprags 50' into engagement with the cylindrical surfaces 64 and 65. The sprags 50' will thus freely slide along the cylindrical surface 64 of the outer member 11.

The steering force is now transmitted to the vehicle wheels through the cage 15a, 15b, pin 54, inner member 12, pinion shaft 44, pinion 43 and rack 42 with the driving system disengaged from the steering system. Thus a manual steering force necessary to control the vehicle wheels is kept within a low level.

Otherwise, the operation of the clutch of this embodiment is substantially the same as those in the previous embodiments.

[TENTH EMBODIMENT]

Figure 28:
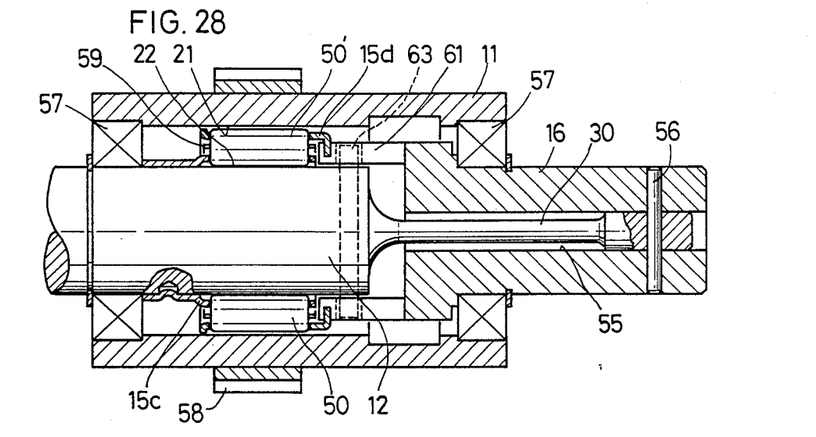
FIG. 28 a vertical sectional view of the tenth embodiment taken along line XXVIII—XXVIII of FIG. 29.
Figure 29:
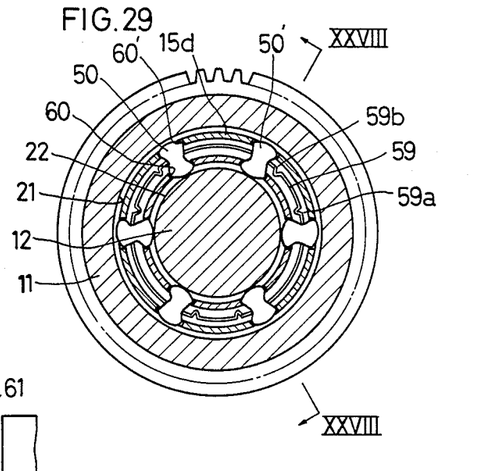
FIG. 29 is a cross-sectional view of the same.

FIGS. 28 and 29 show the tenth embodiment of the clutch according to the present invention having an inner cage 15c and an outer cage 15d with an annular spring 59 disposed therebetween.

The cages 15c and 15d are formed with pockets 60 and 60', respectively. Sprags 50 and 50' are arranged in opposite ways to each other as in the ninth embodiment so that each of them will be received in a pair of pockets 60 and 60'.

Figure 30:
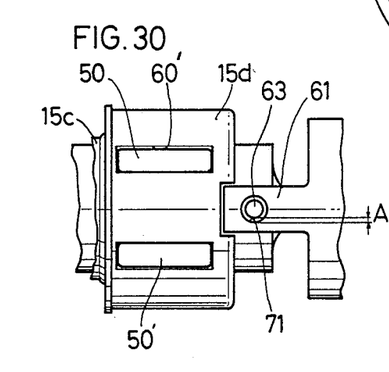
FIG. 30 is a partial plan view of the same showing the function of the clearances A formed in the direction of rotation.

The annular spring 59 is formed with holes to receive the sprags 50 and 50' and serves to bias the sprags 50 and 50' with its respective portions 59a and 59b into engagement with the cylindrical surfaces 64 and 65. The cage 15c is in caulking engagement with the inner member 12, thus preventing them from rotating relative to each other. The cage 15d is in engagement with split ends 61 of the input shaft 16 as shown in FIG. 30. The inner member 12 has pins 63 protruding from its outer periphery so as to be received in holes 11 each formed in a respective split end 61 with clearances A formed at both sides of the pins 63 in the direction of rotation. The clearances A are larger than plays between the split ends 60' and the cage 15d. When the pins 63 are held in the center of the holes, the sprags 50 and 50' are kept out of engagement with the cylindrical surfaces 64 and 65 as in the ninth embodiment.

Otherwise, this embodiment is the same as the ninth embodiment in construction and function.

The sensor 45 used to detect the torsional torque may be provided on the torsion bars 30 shown in FIGS. 24 and 28 or on the steering shaft 12.

What is claimed is:
1. A clutch comprising:
an outer member formed on its inner periphery with a first cam surface;
an inner member coaxially mounted in said outer member and formed on its outer periphery with a second cam surface;
a cage interposed between said outer member and said inner member and thus between said first cam surface and said second cam surface and formed with a plurality of pockets;
means for providing a clearance in the direction of rotation between said cage and one of said outer member and said inner member;
a torque-setting elastic member mounted between said cage and one of said outer member and said inner member to hold said means for providing a clearance in a neutral position with said clearance left therebetween so as to be deformed until said clearance disappears when it is subjected to a torque larger than a predetermined torque;
cam members mounted in said respective pockets formed in said cage and adapted to come into engagement with said first and second cam surfaces when said cage is turned with respect to said one of said two members by a predetermined angle; and
elastic means for biasing said cam members in the circumferential direction of said cage.

* * * * *